United States Patent [19]

Laskaris

[11] 4,291,997
[45] Sep. 29, 1981

[54] FLEXIBLE SUPPORT FOR SUPERCONDUCTING MACHINE ROTOR

[75] Inventor: Evangelos T. Laskaris, Schenectady, N.Y.

[73] Assignee: General Electric Company, Schenectady, N.Y.

[21] Appl. No.: 878,791

[22] Filed: Feb. 17, 1978

[51] Int. Cl.² .............................................. H02K 9/00
[52] U.S. Cl. ...................................... 403/24; 403/28; 310/52
[58] Field of Search ...................... 403/28, 29, 30, 273, 403/24; 310/52, 91, 10, 40 R

[56] References Cited

U.S. PATENT DOCUMENTS

| | | | |
|---|---|---|---|
| 3,517,231 | 6/1970 | Massar | 310/52 |
| 4,060,742 | 11/1977 | Litz | 310/52 |
| 4,091,298 | 5/1978 | Gamble | 310/10 |
| 4,098,476 | 7/1978 | Jutte | 403/30 |

Primary Examiner—Andrew V. Kundrat
Attorney, Agent, or Firm—Nathan D. Herkamp; James C. Davis, Jr.; Paul R. Webb, II

[57] ABSTRACT

In a superconducting machine, differential thermal alterations in axial length of the torque tube, together with angular deflections thereof with respect to the rotor electromagnetic shield, are accommodated by a flexible support having a thin-wall circular diaphragm extending radially from an axially-oriented torsion shaft. The support structure acts as a stiff brace for the torque tube in the radial direction, so as not adversely to affect the rotor critical speeds.

10 Claims, 2 Drawing Figures

FLEXIBLE SUPPORT FOR SUPERCONDUCTING MACHINE ROTOR

INTRODUCTION

This invention relates to electrical machines employing superconducting rotors, and more particularly to a flexible support for accommodating differential thermal displacements of the machine low temperature structural members as well as torsional deflections thereof at steady state and fault conditions.

In a superconducting generator rotor that operates within a permanently sealed vacuum enclosure, differential thermal contraction of the low temperature structural members, such as the torque tube, must be accommodated inside the vacuum envelope. Differential thermal contractions of the torque tube in excess of 0.5 inches are typical in large, three-phase generators for electric utility applications, wherein the torque tube is typically on the order of 140 inches long from end to end, for a large generator.

Simply allowing surfaces in sliding or rolling contact with each other to accommodate the thermal contraction is not satisfactory since it would result in excessive wear within the vacuum environment. Worn structural components cease to provide support, and thus are capable of causing damage to the machine in a variety of different ways during operation.

In E. T. Laskaris application Ser. No. 672,272, filed Mar. 31, 1976, now U.S. Pat. No. 4,082,967, issued Apr. 4, 1978, and assigned to the instant assignee, a superconducting rotor for an electrical machine is described as being divided into three chambers, with each of the two outer chambers being encircled by thermal distance extensions of the rotor torque tube. The radial support members for the torque tube, however, are therein contemplated as being rigid, non-bending structures. As an improvement thereover, the present invention concerns use of a flexible support in the rotor vacuum space to accommodate the differential thermal contractions and angular deflections of the torque tube with respect to the electromagnetic shield. Despite this flexibility, the support must remain sufficiently rigid in the radial direction to support the weight of the torque tube so that the rotor critical speeds are not adversely affected (i.e. they do not coincide with the rotor operating speed). In the present invention, this is accomplished by employing, as the torque tube support, a thin-wall circular diaphragm combined with a torsion shaft.

Accordingly, one object of the invention is to accommodate differential thermal contraction of a superconducting machine rotor torque tube without causing undue wear in the machine.

Another object is to accommodate torsional deflections of a superconducting machine rotor torque tube at steady-state and fault conditions.

Another object is to provide, for a superconducting rotor torque tube, a support which is flexible in the axial and circumferential directions but is stiff in the radial direction to avoid operation of the rotor at a speed close to (e.g. within 5% of) any of the rotor critical speeds.

Briefly, in accordance with a preferred embodiment of the invention, a superconducting electrical machine includes a rotor containing a torque tube therein having an axial extension at least at one end thereof. The machine includes a support for the torque tube comprising a cylindrical torsion shaft having its cylindrical surface centered about a longitudinal axis and adapted to rotate thereabout. An axially flexible, radially stiff diaphragm is affixed radially about the torsion shaft. The diaphragm is attached at its distal boundary to the torque tube and is free to exhibit axial movement at its distal boundary in response to thermally-produced axial displacements of the torque tube.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DESCRIPTIONS OF TYPICAL EMBODIMENTS

Figure 1:
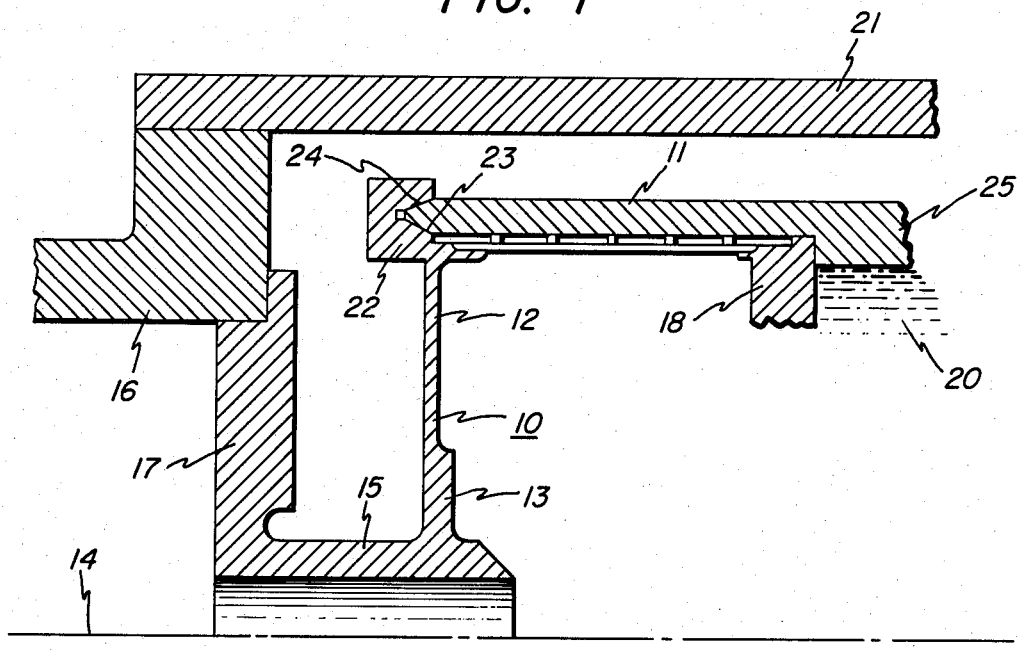
FIG. 1 is a longitudinal fragmentary view of the interior portion of a superconducting electrical machine in the vicinity of the flexible rotor support of the invention, illustrating the rotor support in partial sectional view.

In FIG. 1, a flexible support 10 orthogonally oriented with respect to rotor axis 14 is shown located at the extreme end of rotor torque tube thermal distance extension 11 which, in turn, is integrally joined to the undriven end of torque tube 25. The structure and function of thermal distance extensions are described in the aforementioned Laskaris U.S. Pat. No. 4,082,967. Support 10 comprises a radially stiff thin-wall circular diaphragm portion 12 which is relatively flexible in the axial direction, and having a relatively rigid inner portion 13 affixed to a hollow torsion shaft 15 either integrally as shown, or through a welded or brazed joint. Diaphragm 12 is, therefore, capable of flexing axially about its circular interface with inner portion 13 of support 10, in response to axial displacements of torque tube 11. Torsion shaft 15 is affixed, as by bolting, to undriven shaft 16 through a rigid radial member 17, and is typically comprised of a high-strength material such as titanium or Inconel. Radial wall 18 constitutes the undriven end boundary of the rotor chamber in which the rotor windings (not shown) are immersed in cryogenic coolant, such as liquid helium 20. As shown in FIG. 1, diaphragm 12 is in a zero stress condition.

The primary function of thin-wall diaphragm 10 is to accommodate the maximum differential thermal contraction between torque tube extension 11 and electromagnetic shield 21. The thermal contraction is the net result of expansion of electromagnetic shield 21 due to transient heating of the shield during momentary terminal or line-to-line faults, or during the negative sequence operation of the superconductive generator in which the illustrated apparatus is situated, and of contraction of the rotor torque tube as a result of cooling the torque tube from ambient temperature to cryogenic temperature, including transient overcooling of the torque tube extensions in the event of a normal transition of the superconducting winding or rapid cooldown of the rotor winding.

Figure 2:
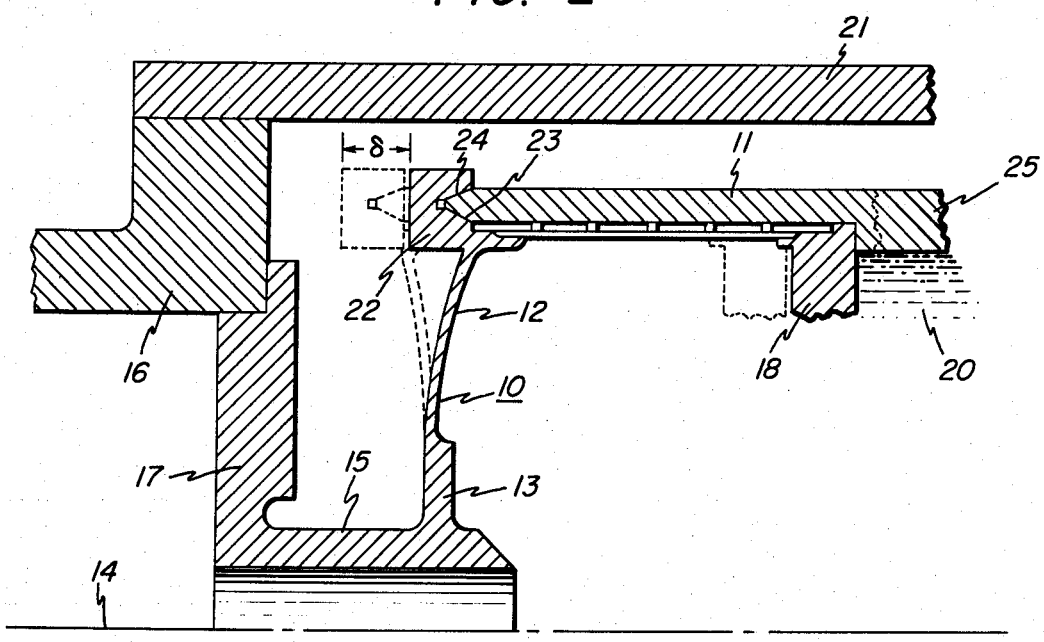
FIG. 2 is a longitudinal fragmentary view of the apparatus shown in FIG. 1, illustrating the rotor support during the cooled condition of the rotor and showing its ambient temperature position in phantom.

During assembly procedures, diaphragm 12 is installed with an initial deflection toward the undriven end of the rotor, as illustrated in phantom in FIG. 2.

Subsequent thermal contraction of torque tube 25 and torque tube extension 11, with respect to electromagnetic shield 21, will deflect flange 22 of diaphragm 12 by a distance δ toward the driven-end of the rotor. In this manner, the amount of axial bending of diaphragm 12 from the normal in either direction, with respect to axis 14, is minimized.

To relieve any residual radial stresses that diaphragm 12 may experience as a result of forging operations, heat treatment, and machining, it is given an initial radial compression during assembly. This is accomplished by shrinkfitting torque tube extension 11 onto the inner tapered circumference 23 on diaphragm rim 22, while the diaphragm is in the position illustrated in FIG. 1. As a result of this stress-relieving operation, excessive axial stiffness of the diaphragm is avoided.

Diaphragm rim 22 is tightly wedged axially onto the undriven end of torque tube extension 11 so that surfaces 23 and 24, which comprise a double-tapered groove, assure that rapid, thermally-induced differential radial movements of torque tube extension 11 with respect to diaphragm 12 cannot disengage the fit and cause dynamic unbalance of the rotor.

Diaphragm 12 accommodates axial deflections by bending and stretching as a membrane. The axial load resulting from the combined effects of diaphragm bending and stretching varies as the cube of the axial displacement for large deflections, and is in proportion to the axial displacement for small deflections.

Diaphragm 12 is also subjected to torsional loading resulting from angular displacements of torque tube 25 with respect to electromagnetic shield 21. The peak torsional displacements of torque tube 25 (and hence torque tube extension 11) occur in response to the worst generator faults, during which large transient torques are exerted on electromagnetic shield 21. Since diaphragm 12 is very stiff in torsion, hollow torsion shaft 15 serves to accommodate the torsional displacements. As a result of torsion shaft 15 being coupled to diaphragm 12, torque resulting from the torsional displacement imposed on torsion shaft 15 is transmitted through the diaphragm, giving rise to a maximum shear stress at the circular interface with inner portion 13 of support 10.

Stresses on diaphragm 12 are mainly of a static (i.e., steady) nature, with the exception of torsional loading during intermittent, short-duration generator faults. This torsional loading is accommodated by torsion shaft 15. The torsion shaft, however, also experiences an alternating bending stress since it partially supports the weight of torque tube 25, torque tube extension 11, and the rotor winding (not shown); that is, with every 180° of rotation, the torsion shaft experiences a stress reversal which necessarily occurs at a frequency depending upon its angular velocity.

Design of torsion shaft 15 is based on considerations of cyclic fatigue duty in flexure and steady torsional loading. The critical speed of the torsion shaft in bending as a cantilever beam subjected to an end load is preferably made sufficiently high, by being fabricated as short as possible, consistent with avoiding contact between diaphragm rim 22 and undriven shaft 16 at ambient temperature conditions, and by being reasonably thick and of fairly large diameter so as to achieve a high polar moment of inertia. For example, in a large generator having a torque tube outside radius of 11.3 inches, a typical torsion shaft may have a 0.75 inch inner radius, a 1.35 inch outer radius, and maximum axial length between diaphragm inner portion 13 and radial member 17 of 3.0 inches. In this fashion, torsion shaft 15 does not affect adversely the flexural dynamics of the rotor at its operating speed.

The foregoing describes a technique for accommodating differential thermal contraction of a superconducting machine rotor torque tube without causing undue wear in the machine. Torsional deflections of the rotor torque tube under both steady-state and fault conditions are accommodated. The invention provides a support for a superconducting machine rotor torque tube, the support being flexible in the axial and circumferential directions, but stiff in the radial direction to avoid operation of the rotor close to any of the critical speeds where large vibration amplitudes result by virtue of resonance effects.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. In a superconducting electrical machine including a rotor containing a torque tube therein, a support for said torque tube, said support comprising:
    a cylindrical torsion shaft having its cylindrical surface centered about an axis and adapted to rotate thereabout; and
    an axially flexible, radially stiff diaphragm affixed radially about said torsion shaft, said diaphragm being interfitted so as to be attached at its distal boundary to said torque tube and being free to exhibit axial movement thereat.

2. The apparatus of claim 1 wherein said diaphragm includes a rigid inner portion affixed to said torsion shaft, and an axially flexible, radially stiff outer portion affixed to said inner portion.

3. The apparatus of claim 2 wherein said inner portion of said diaphragm is of greater thickness than said outer portion of said diaphragm.

4. The apparatus of claim 1 wherein said diaphragm includes a rim, said rim being wedged axially onto the undriven end of said torque tube, said rim including a double-tapered groove therein fitted tightly about a cooperating double-tapered end configuration of said torque tube extension.

5. The apparatus of claim 4 wherein said diaphragm includes a rigid inner portion affixed to said torsion shaft, and an axially flexible, radially stiff outer portion affixed to said inner portion.

6. The apparatus of claim 5 wherein said inner portion of said diaphragm is of greater thickness than said outer portion of said diaphragm.

7. The apparatus of claim 6 wherein said torque tube extension is shrink-fitted onto said diaphragm rim, so as to compress said diaphragm radially.

8. The apparatus of claim 1 wherein said flexible diaphragm is bent in an axial direction away from said torque tube at ambient torque tube temperature, and is bent in an axial direction toward said torque tube at cryogenic torque temperatures.

9. The apparatus of claim 8 wherein said diaphragm includes a rigid inner portion affixed to said torsion shaft and situated substantially orthogonally with respect to the longitudinal axis of said rotor, and an axially flexible, radially stiff outer portion affixed to said inner portion, said outer portion exhibiting said bending.

10. The apparatus of claim 9 wherein said inner portion of said diaphragm is of greater thickness than said outer portion of said diaphragm.

* * * * *